United States Patent
De Vries et al.

(10) Patent No.: US 11,080,990 B2
(45) Date of Patent: Aug. 3, 2021

(54) PORTABLE 360-DEGREE VIDEO-BASED FIRE AND SMOKE DETECTOR AND WIRELESS ALERTING SYSTEM

(71) Applicant: Factory Mutual Insurance Company, Johnston, RI (US)

(72) Inventors: Jaap De Vries, Providence, RI (US); Stanislav Kostka, Norwood, MA (US); Raphael Hussni Leonessa, San Paulo (BR); Kyle Richard Burchesky, East Walpole, MA (US)

(73) Assignee: Factory Mutual Insurance Company, Johnston, RI (US)

( * ) Notice: Subject to any disclaimer, the term of this patent is extended or adjusted under 35 U.S.C. 154(b) by 0 days.

(21) Appl. No.: 16/532,082

(22) Filed: Aug. 5, 2019

(65) Prior Publication Data

US 2021/0043069 A1    Feb. 11, 2021

(51) Int. Cl.
  *G08B 29/18* (2006.01)
  *H04N 5/232* (2006.01)
  *G06T 11/60* (2006.01)
  *H04N 7/18* (2006.01)
  *G06K 9/00* (2006.01)
  (Continued)

(52) U.S. Cl.
  CPC ........ *G08B 29/185* (2013.01); *G06K 9/00711* (2013.01); *G06K 9/00771* (2013.01); *G06T 11/60* (2013.01); *G08B 17/10* (2013.01); *G08B 25/10* (2013.01); *H04N 5/23238* (2013.01); *H04N 7/183* (2013.01)

(58) Field of Classification Search
  CPC ...... G08B 29/185; G08B 17/10; G08B 25/10; G06K 9/00711; G06K 9/00771; G06T 11/60; H04N 5/23238; H04N 7/183
  USPC .................................................. 348/143, 36
  See application file for complete search history.

(56) References Cited

U.S. PATENT DOCUMENTS

| | | |
|---|---|---|
| 5,117,223 A | 5/1992 | Tanner |
| 5,726,632 A | 3/1998 | Barnes et al. |
| | (Continued) | |

FOREIGN PATENT DOCUMENTS

| | | |
|---|---|---|
| EP | 0818766 B1 | 3/2002 |
| WO | 2017/065808 A1 | 4/2017 |
| | (Continued) | |

OTHER PUBLICATIONS

Yu-Chuan Su et al., "Learning Spherical Convolution for Fast Features from 360° Imagery", NIPS 2017 (Year: 2017).*
(Continued)

*Primary Examiner* — Matthew K Kwan
(74) *Attorney, Agent, or Firm* — Baker Botts L.L.P.; Michael A. Sartori (57) ABSTRACT

An aspect of the invention includes a fire and smoke detection system including a 360-degree camera, and a computing platform in communication with the 360-degree camera. The computing platform is configured to receive an image or video from the 360-degree camera, determine that tire or smoke is detected in the image or video received from the 360-degree camera, and venerate at least one alert in response to determining that fire or smoke is detected in the image or video received from the 360-degree camera. The fire and smoke detection system may be portable and not removably mounted.

14 Claims, 4 Drawing Sheets
(2 of 4 Drawing Sheet(s) Filed in Color)

(51) Int. Cl.
  *G08B 17/10* (2006.01)
  *G08B 25/10* (2006.01)

(56) References Cited

U.S. PATENT DOCUMENTS

| | | | |
|---|---|---|---|
| 6,364,026 | B1 | 4/2002 | Doshay |
| 6,529,230 | B1 | 3/2003 | Chong |
| 6,588,701 | B2 | 7/2003 | Arie |
| 6,611,207 | B1 | 8/2003 | Yuan et al. |
| 6,844,818 | B2 | 1/2005 | Grech-Cini |
| 6,970,183 | B1 | 11/2005 | Monroe |
| 6,975,225 | B2 | 12/2005 | Privalov et al. |
| 7,047,108 | B1 | 5/2006 | Rainier et al. |
| 7,072,739 | B2 | 7/2006 | Bash et al. |
| 7,098,796 | B2 | 8/2006 | Chen et al. |
| 7,206,753 | B2 | 4/2007 | Bancroft et al. |
| 7,228,203 | B2 | 6/2007 | Koselka et al. |
| 7,245,315 | B2 | 7/2007 | Sadok et al. |
| 7,256,818 | B2 | 8/2007 | Sadok et al. |
| 7,283,057 | B2 | 10/2007 | Kim |
| 7,286,704 | B2 | 10/2007 | Pfefferseder et al. |
| 7,495,573 | B2 | 2/2009 | Tice et al. |
| 7,619,534 | B2 | 11/2009 | Barrieau et al. |
| 7,868,772 | B2 | 1/2011 | Chao et al. |
| 7,952,476 | B1 | 5/2011 | Causey et al. |
| 8,355,818 | B2 | 1/2013 | Nielsen et al. |
| 8,359,122 | B2 | 1/2013 | Koselka et al. |
| 8,368,757 | B2 | 2/2013 | Graeser et al. |
| 8,588,969 | B2 | 11/2013 | Frazier |
| 8,760,285 | B2 | 6/2014 | Billman et al. |
| 8,907,799 | B2 | 12/2014 | McKenna |
| 8,933,804 | B2 | 1/2015 | Causey et al. |
| 8,973,671 | B2 | 3/2015 | Alsaif et al. |
| 9,047,515 | B2 | 6/2015 | Cetin et al. |
| 9,277,121 | B2 | 3/2016 | Kozko |
| 9,412,247 | B2 | 8/2016 | Kore et al. |
| 9,503,275 | B2 | 11/2016 | Hatae et al. |
| 9,712,985 | B2 | 7/2017 | Chu et al. |
| 9,742,582 | B2 | 8/2017 | Hatae et al. |
| 9,819,911 | B2 | 11/2017 | K V et al. |
| 9,953,511 | B2 | 4/2018 | Eskildsen et al. |
| 9,984,558 | B2 | 5/2018 | Artes et al. |
| 10,019,880 | B1 | 7/2018 | Winters |
| 10,055,803 | B2 | 8/2018 | Orduna et al. |
| 10,068,373 | B2 | 9/2018 | Lee et al. |
| 10,210,746 | B2 | 2/2019 | Eskildsen et al. |
| 10,225,492 | B1 | 3/2019 | Steffanson et al. |
| 10,249,158 | B1 | 4/2019 | Jordan, II et al. |
| 10,255,792 | B2 | 4/2019 | Farrand et al. |
| 10,257,330 | B1 | 4/2019 | Mercer |
| 10,265,859 | B2 | 4/2019 | Deyle et al. |
| 10,296,194 | B2 | 5/2019 | McLean et al. |
| 10,297,129 | B2 | 5/2019 | Piccolo |
| 10,304,306 | B2 | 5/2019 | Mills et al. |
| 10,360,780 | B2 | 7/2019 | Balaji et al. |
| 10,413,763 | B2 | 9/2019 | Won et al. |
| 2004/0216165 | A1 | 10/2004 | Inata et al. |
| 2007/0019077 | A1 | 1/2007 | Park |
| 2007/0039744 | A1 | 2/2007 | Pavesi |
| 2007/0171042 | A1 | 7/2007 | Petru et al. |
| 2008/0136934 | A1 | 6/2008 | Zhao et al. |
| 2010/0179691 | A1 | 7/2010 | Gal et al. |
| 2011/0058037 | A1 | 3/2011 | Hanses et al. |
| 2012/0176218 | A1 | 7/2012 | Jin |
| 2013/0242091 | A1 | 9/2013 | Kwon |
| 2014/0022385 | A1* | 1/2014 | Fischer .............. G08B 17/125 348/143 |
| 2014/0062706 | A1 | 3/2014 | Frazier et al. |
| 2014/0104067 | A1 | 4/2014 | Chien |
| 2014/0232768 | A1 | 8/2014 | Dougherty |
| 2015/0347861 | A1* | 12/2015 | Doepke .............. G06K 9/00449 382/199 |
| 2015/0381536 | A1 | 12/2015 | Ptitsyn |
| 2016/0065414 | A1 | 3/2016 | Sundermeyer et al. |
| 2016/0117635 | A1 | 4/2016 | Parker et al. |
| 2016/0321900 | A1 | 11/2016 | Rao et al. |
| 2016/0323210 | A1* | 11/2016 | Yoakum ................ H04L 51/16 |
| 2017/0092138 | A1 | 3/2017 | Trundle et al. |
| 2017/0193811 | A1 | 7/2017 | Stowell et al. |
| 2018/0063440 | A1* | 3/2018 | Kopf .................. H04N 5/23238 |
| 2018/0165931 | A1 | 6/2018 | Zhang |
| 2018/0316867 | A1 | 11/2018 | Mathur et al. |
| 2019/0054326 | A1 | 2/2019 | Lin |
| 2019/0066488 | A1 | 2/2019 | Locke et al. |
| 2019/0168711 | A1 | 6/2019 | Oesterling et al. |
| 2019/0189159 | A1* | 6/2019 | Gan .................. G06K 9/00744 |
| 2019/0240517 | A1 | 8/2019 | Clarke et al. |
| 2019/0244504 | A1* | 8/2019 | Ebata .................. G08B 17/125 |
| 2019/0279478 | A1 | 9/2019 | Ebata |
| 2019/0287363 | A1 | 9/2019 | Balaji et al. |
| 2019/0289134 | A1 | 9/2019 | Dawes |
| 2019/0294165 | A1 | 9/2019 | Klaus et al. |

FOREIGN PATENT DOCUMENTS

| | | |
|---|---|---|
| WO | 2018/051349 A1 | 3/2018 |
| WO | 2018/107916 A1 | 6/2018 |
| WO | 2018/116966 A1 | 6/2018 |
| WO | 2018/190478 A1 | 10/2018 |
| WO | 2019/137930 A1 | 7/2019 |

OTHER PUBLICATIONS

Ko, et al., "Fire Surveillance using an Omni-Directional Camera for Remote Monitoring," Jul. 11, 2008, https://ieeexplore.ieee.org/abstract/document/4568542.

Hartung et al., "FireWxNet: A Multi-Tiered Portable Wireless System for Monitoring Weather Conditions in Wildland Fire Environments," MobiSys 2006, pp. 2841.

Zhao, Q., Zhu, C., Dai, F., Ma, Y., Jin, G., & Zhang, Y. (2018). Distortion-aware CNNs for Spherical Images. IJCAI International Joint Conference on Artificial Intelligence, Jul. 2018, 1198-1204.

Yang, W., Qian, Y., Kamarainen, J. K., Cricri, F., & Fan, L. (2018). Object Detection in Equirectangular Panorama. Proceedings—International Conference on Pattern Recognition, Aug. 2018, 2190-2195.

Yumfond Spy Hidden Camera. Product Webpage [online]. Yumfond, 2019 [retrieved on May 16, 2019]. Retrieved from the Internet: <URL: https://www.amazon.com/Yumfond-Detector-Detection-Recording-Security/dp/B07NRCLYRZ>.

\* cited by examiner

PORTABLE 360-DEGREE VIDEO-BASED FIRE AND SMOKE DETECTOR AND WIRELESS ALERTING SYSTEM

TECHNICAL FIELD

The present application relates generally to a system for fire and smoke detection and alerting. More specifically, the present application relates to a portable, 360-degree, video-based fire and smoke detection system with wireless alerting.

BACKGROUND

A fire and smoke detection system is an important safety tool used in hazardous or exposed environments, such as a construction environment or a hot work environment. A hot work environment may be an environment that has an activity the produces flames, sparks, and/or heat. Examples of activities in a hot work environment include welding, cutting, grinding, soldering, brazing, drilling, and thawing pipes. Fire and smoke detection are also important in environments with low traffic, like warehouses, where fire or smoke may not be noticed until it is too late to stop. Conventional video-based fire and smoke detection systems are often in fixed locations, such as mounted to a wall, provide low resolution video, have limited visibility, and are difficult to monitor. These conventional systems are also highly inaccurate, resulting in false positives and false-negatives that undermine trust in the systems.

SUMMARY

An aspect of the invention includes a fire and smoke detection system including a 360-degree camera, and a computing platform in communication with the 360-degree camera. The computing platform is configured to receive an image or video from the 360-degree camera, determine that fire or smoke is detected in the image or video received from the 360-degree camera, and generate at least one alert in response to determining that fire or smoke is detected in the image or video received from the 360-degree camera. The fire and smoke detection system is portable and not removably mounted.

Another aspect of the invention includes a method to detect fire and smoke using a portable system. The portable system includes a computing platform and a 360-degree camera in communication with the computing platform, the computing platform includes one or more microprocessors and memory, and the computing platform using the one or more microprocessors to execute software code stored in the memory. The method includes capturing an image or video by the 360-degree camera, transforming the image or video to an equirectangular image or equirectangular video, and processing the equirectangular image or equirectangular video by the computing, platform using convolutional neural network software code to determine whether fire appears in the equirectangular image or equirectangular video. The method further includes processing the equirectangular image or equirectangular video by the computing platform using the convolutional neural network software code to determine whether smoke appears in the equirectangular image or equirectangular video. The method also includes generating at least one alert in response to determining that fire or smoke is in the image or video received from the 360-degree camera.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements. The patent or application file contains at least one drawing executed in color. Copies of this patent or patent application publication with color drawing(s) will be provided by the Office upon request and payment of the necessary fee.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed, and other methods developed without departing from the spirit and scope of the invention.

Figure 1:
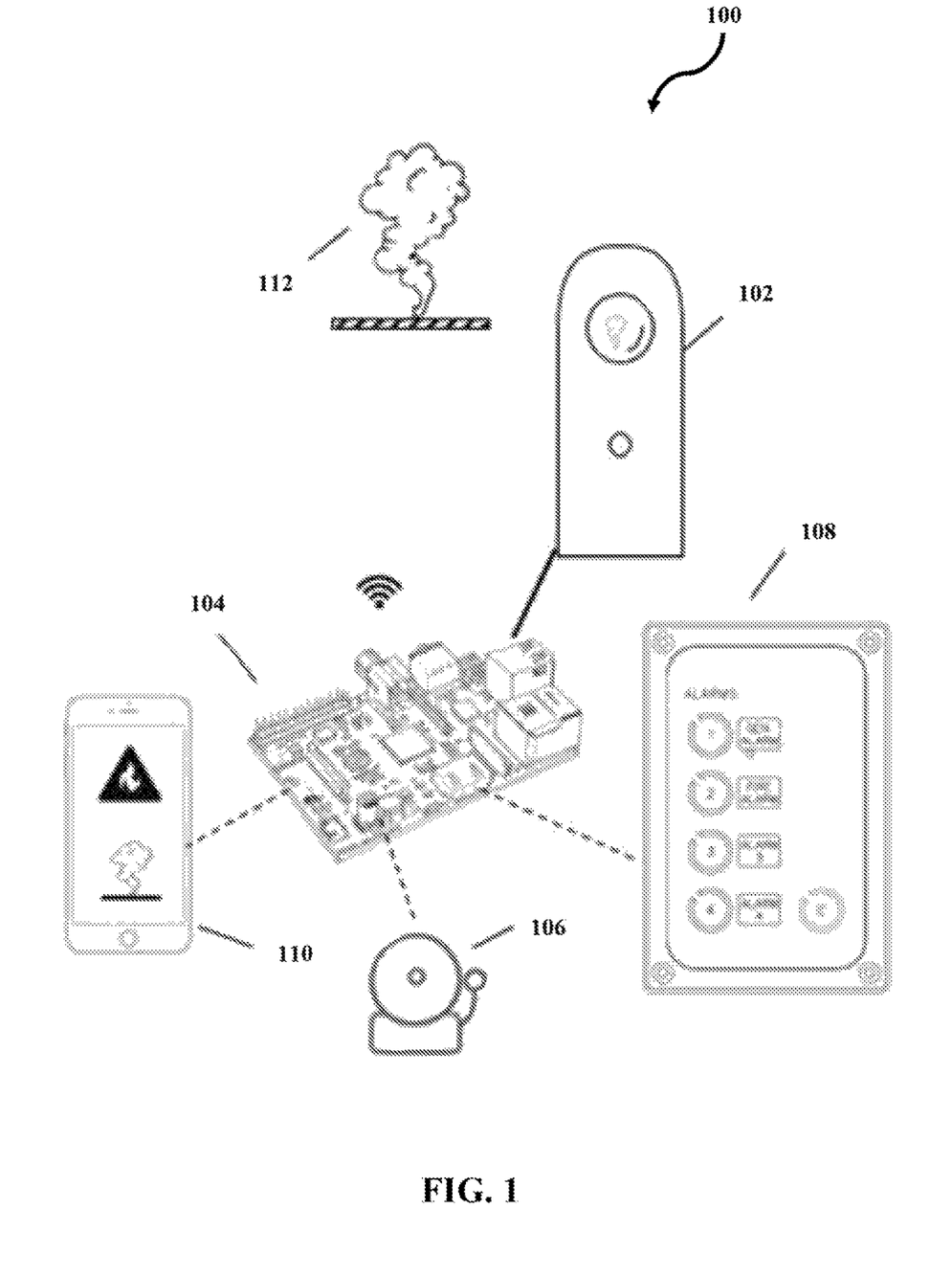
FIG. 1 illustrates a video-based fire and smoke detection system in a non-limiting exemplary embodiment of the invention.

FIG. 1 illustrates a video-based fire and smoke detection system (the "VFD system") 100 in a non-limiting exemplary embodiment of the invention. The VFD system 100 may include a 360-degree camera 102, a computing platform 104, a local alarm 106, a fire alarm panel 108, and one or more mobile devices 110. The VFD system 100 is used to detect fire and smoke 112, as illustrated in FIG. 1. One component of the VFD system 100 is the 360-degree camera 102 which is used to capture digital video and/or images. The captured digital video and/or images are processed by the VFD system 100 to detect fire and smoke 112. The 360-degree camera 102 may be capable of taking high resolution video and images (e.g., 4 k video, 8 k video).

The 360-degree camera 102 and the computing platform 104 may be in communication with each other. The 360-degree camera 102 may be electronically connected to the computing platform 104 or may be wirelessly connected to the computing platform 104. In some embodiments, the 360-degree camera 102 is connected to the computing platform 104 using a universal serial bus (USB).

The VFD system 100 uses the computing platform 104 to determine if there is Fire or smoke in the video or images collected by the 360-degree camera 102, The computing platform 104 has access to the necessary information to perform the fire and smoke detection within the computing platform 104 itself. The computing platform 104 may receive the video or images collected by the 360-degree camera 102 and process the collected video or images to determine if fire or smoke appears in the collected video or images.

In an exemplary embodiment, the computing platform 104 may include, for example, one or more microprocessors and other hardware components such as, for example, volatile and non-volatile memory, input/output connections, network connections, etc. The one or more microprocessors may be operable to execute software code to perform fire and smoke detection based on the video or images collected by the 360-degree camera 102. The software code executed by the one or more microprocessors may be stored in the memory of the computing platform 104.

The computing platform 104 may be connected to the local alarm 106, the fire alarm panel 108, and the mobile devices 110. In some embodiments, the computing platform 104 is electronically or wirelessly connected to the local alarm 106, In some embodiments, the computing platform 104 is electronically or wirelessly connected to the local alarm 106 and electronically or wirelessly connected to the fire alarm panel 108.

The local alarm 106 may provide an audible alert within the environment being monitored to indicate that fire or smoke was detected. The alarm may be audible in the vicinity of the VFD system 100. In some environments, such as an active construction site, this alert may be sufficient. In other environments, such as an empty warehouse being monitored, a local alarm may need to be placed where it can be monitored, or may need additional alerting mechanisms (e.g., the fire alarm panel 108, and alerts to the user mobile device 110). The fire alarm panel 108 may be connected to multiple fire or smoke detection mechanisms and may be used to indicate fire or smoke in a particular location or zone. Additionally, the fire alarm panel 108 may be connected to the local fire department to request emergency services when a fire or smoke is detected.

In some embodiments, the local alarm 106 is attached and integrated into the portable VFD system 100. In other embodiments, the local alarm 106 may be an existing alarm (e.g., existing building alarm) which the computing platform 104 is able to communicate with. In these embodiments, the local alarm 106 may be electronically connected directly to the computing platform 104, or the computing platform 104 may use a network or other wireless communication protocol (e.g., will, cellular communications, Bluetooth, NFC, radio-frequency) to communicate with the local alarm 106. Similarly, the fire alarm panel 108 may be electronically connected to the computing platform 104 and attached to the VFD system 100. In other embodiments, the fire alarm panel 108 may be separate from the physical VFD system 100, and the computing platform 104 may communicate with the tire alarm panel 108 using a direct electronic communication or a wireless communication protocol.

The computing platform 104 may also communicate with the one or more user mobile devices 110. The user mobile devices 110 may include typical mobile devices such as a cell phone, tablet, PDA, smart watch, or any other mobile device capable of interaction and communication with the VFD system. The user mobile devices 110 may be used to control the VFD system 100, monitor the VFD system 100, and alert the user of fire or smoke detection. The computing platform 104 may communicate with the user mobile devices 110 using a wireless network, cellular network, or SMS text messages. In some embodiments, other wireless communication protocols may be used to communicate with the user mobile devices 110 (e, g, NFC, Bluetooth). The user may initiate the VFD system 100 using the user mobile devices 110 and provide two cellular phone numbers to receive alerts in case of fire or smoke detection. The user may also view the video or images captured by the 360-degree camera 102 in real-time using the user mobile device 110. When fire or smoke is detected, the user may view the video or images captured by the 360-degree camera 102 along with an indication of the fire or smoke detected. The user may have the ability to cancel alarms or dismiss alerts received by the user mobile devices 110 using the mobile device itself. In some embodiments, the local alarm 106 and the fire alarm panel 108 must be turned off locally and cannot be controlled by the user mobile devices 110.

In some embodiments, the VFD system 100 is a fully portable solution. The VFD system 100 is portable, and in contrast to conventional systems, the VFD system 100 is not permanently mounted and is not removably mounted. By being portable, the VFD system 100 may be moved to a new location quickly and efficiently. In these embodiments, the 360-degree camera 102 and the computing platform 104 may be battery-powered in order to allow complete portability of the system. The VFD system 100 may use exclusively wireless communication protocols to communicate with the local, alarm 106, the fire alarm panel 108, and the user mobile devices 110 to maintain the portability of the system. In these embodiments, there may be additional alerting necessary to indicate to the user mobile devices 110 when the VFD system 100 is running out of battery power or is not able to communicate wirelessly.

Figure 2:
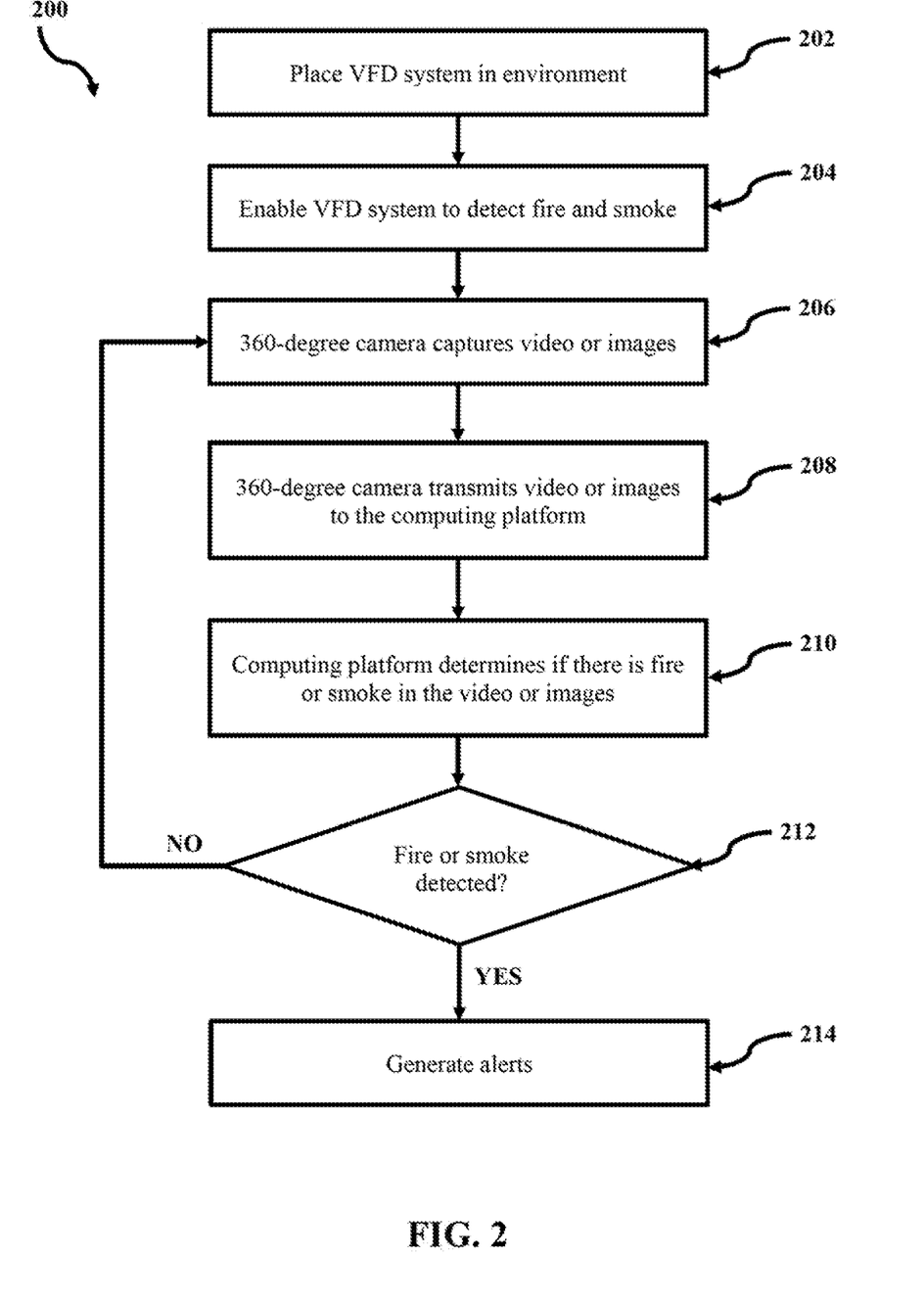
FIG. 2 depicts a flow chart of the video-based fire and smoke detection system with alerting in a non-limiting exemplary embodiment of the invention.

FIG. 2 depicts a flow chart of the video-based fire and smoke detection system with alerting in a non-limiting exemplary embodiment of the invention. The detection and alerting process 200 begins with the step 202 of placing the VFD system 100 in the environment where fire and smoke are to be detected. Because the VFD system 100 is portable, the VFD system 100 may be placed where fire or smoke may likely occur, such as in a construction environment or in a hot work environment. A hot work environment may be temporary, such as after welding is concluded, and because the VFD system 100 is portable, the VFD system 100 may be placed in the hot work environment and used to monitor the hot work environment after the welders have left.

The placement of the VFD system 100 may impact how accurately or effectively the detection and alerting process 200 may detect fire and smoke. In some embodiments, the compactness and portability of the VFD system 100 provides the benefit of allowing the VFD system to be placed in the location most likely to detect fire and smoke. For example, in a warehouse, rather than mounting a fire detection system on the ceiling or a wall, the VFD system 100 can be placed in the center of the room and have full visibility of the entire environment. In some embodiments, the placement of the VFD system 100 may be restricted by the connectivity required by the system (e.g., w ireless communications), in some embodiments, the placement of the VFD system 100 may be dictated by the type of work expected to generate fire or smoke (e.g., construction environment, or hot work environment).

Once the VFD system 100 has been placed in the environment, the system must be enabled to begin detection in step 204. In some embodiments, this may be as simple as the user physically turning on the VFD system 100, allowing the VFD system 100 to begin local monitoring and alerting. In other, embodiments, the VFD system 100 must be enabled using a user mobile device 110, In these embodiments, a user may wirelessly connect a user mobile device 110 to the VFD system 100 and enable the system to begin detection and alerting. In some embodiments, the user must provide the VFD with two cell phone numbers (i.e., a primary and secondary number) to be alerted in case of tire detection. This two-tiered alerting system may be used to ensure that any fire or smoke detected will be acknowledged by the users. When the VFD system 100 is enabled, the system may perform a calibration process based on the detected lighting condition and other environmental factors.

After enabling the VFD system 100, in step 206, the 360-degree camera 102 begins capturing video or images. Depending on the hardware used, the 360-degree camera 102 may provide its own processing to convert the 360-degree image into a two-dimensional image. For example, the 360-degree camera 102 may produce equirectangular projected panoramas, where the equirectangular projection maps spherical geometry onto a plane. The equirectangular protection maps meridians to vertical straight lines of constant spacing, (for meridional intervals of constant spacing) and maps e roles of latitude to horizontal straight lines of constant spacing (for constant intervals of parallels). While not strictly a projection, representing spherical surfaces in a rectangular form uses the polar angles directly as the horizontal and vertical coordinates. Since longitude varies over $2\pi$ and latitude only over $\pi$, such polar maps are normally presented in a 2:1 ratio of width to height. These projections in general have an increased vertical stretching as one moves towards either of the poles. In some embodiments, the 360-degree camera 102 may capture the video or images using a stereographic projection. In yet other embodiments, the computing platform 104 may convert the video or images captured by the 360-degree camera 102 into a stereographic projection to use for fire and smoke detection.

After capturing the video or images, the 360-degree camera 102 transmits the data to the computing platform 104 in step 208. In some embodiments, the video or image data is transmitted continuously in real-time. In other embodiments, the video or image data is collected and transmitted at intervals (e.g., every second, every five seconds, every 15 seconds, every 30 seconds, every minute, etc.). Intervals may be used to reduce the processing power and power consumption required of the VFD system 100. In some embodiments, the computing platform 104 stores the video or image information received from the 360-degree camera 102. In these embodiments, the computing platform 104 may store the information permanently, temporarily (e.g., 12 hours, one day, one week), or transmit the collected information to another storage repository, in some embodiments, this information may be used to improve the training algorithm used by the computing platform 104.

In step 210, the computing platform 104 determines if there is fire or smoke detected in the video or images captured by the 360-degree camera 102. In an exemplary embodiment, the computing platform 104 may use a convolutional neural network (CNN) to perform the tire and smoke detection. The computing platform 104 may employ the one or more microprocessors and memory to implement the CNN, For example, the computing platform 104 may store software code for implementing the CNN in memory and may execute the CNN software code using the one or more microprocessors.

A CNN is a class of deep neural networks and can be used with visual imagery, A CNN may use a series of filters and transformation to determine the similarity between the video or image being processed and known objects (fire and smoke in this case). Based on a threshold of similarity, the CNN may determine whether the video or image includes the object being detected (fire and smoke in this case). While CNNs have been used in, computer CNN s are not applied to 360-degree equirectangular video or images due to the large distortion effects. With this invention, the distortion problem is overcome by using a distortion-aware convolutional neural network. A distortion-aware CNN is able to overcome the distortions in the 360-degree video or images to accurately detect fire and smoke by integrating the distortions into the training of the CNN, With the invention, the CNN may detect fire and smoke individually and separately. Particularly, with the invention, each instance of fire in the video or image may be detected and identified, and each instance of smoke in the video or image may be separately detected and identified.

In some embodiments, the distortion-aware CNN may be trained based on data obtained during fire testing. This data may include, for example, exposures to rack storage fires up to 50 ft high, pool fires, wall fires, smoke generators, etc. The video and images used for training may have a resolution of at least 10 pixels per degree (3840×1920). Videos and images obtained for training may be annotated and divided into training, validation, and test data in a 60/20/20 split. The training data may be used to train the CNN to detect fire and smoke in various environments. The validation data may be used to validate various scenarios to ensure fire and smoke is detected accurately. The validation data may be used to validate for false positives and false negatives. Finally, test data may be used to continually test the algorithm using new data not used for training or validation. In some embodiments, the CNN may be further calibrated using data obtained from a specific environment in which the VFD system 100 is placed, especially when false positives or false negatives are encountered while using the VFD system 100.

In step 212, if the computing platform 104 did not detect fire or smoke in the video or image, the VFD system 100 continues to capture 360-degree video or images in step 206. If, however, the computing platform 104 did detect fire or smoke, the VFD system 100 proceeds to generate alerts in step 214. There are three mechanisms for alerting included in the VFD system 100; the local alarm 106, the fire alarm panel 108, and the user mobile devices 110, The user may customize these alerting mechanisms or decide to use a subset of these mechanisms for alerting.

For example, the local alarm 106 may immediately sound alerts when fire or smoke is detected in the environment. The local alarm 106 may be disabled only manually by, for example, pressing a button on the VFD system 100 or the local alarm 106 itself. In other embodiments, the local alarm 106 may be controllable using the user mobile device 110 to allow for remote disabling of the local alarm. The local alarm 106 is primarily used as an immediate alerting system for users in audible vicinity of the VFD system 100. The fire alarm panel 108 may also be triggered automatically. However, in some embodiments, the fire alarm panel 108 may only be triggered after certain interactions with the user mobile devices 110.

Figure 4:
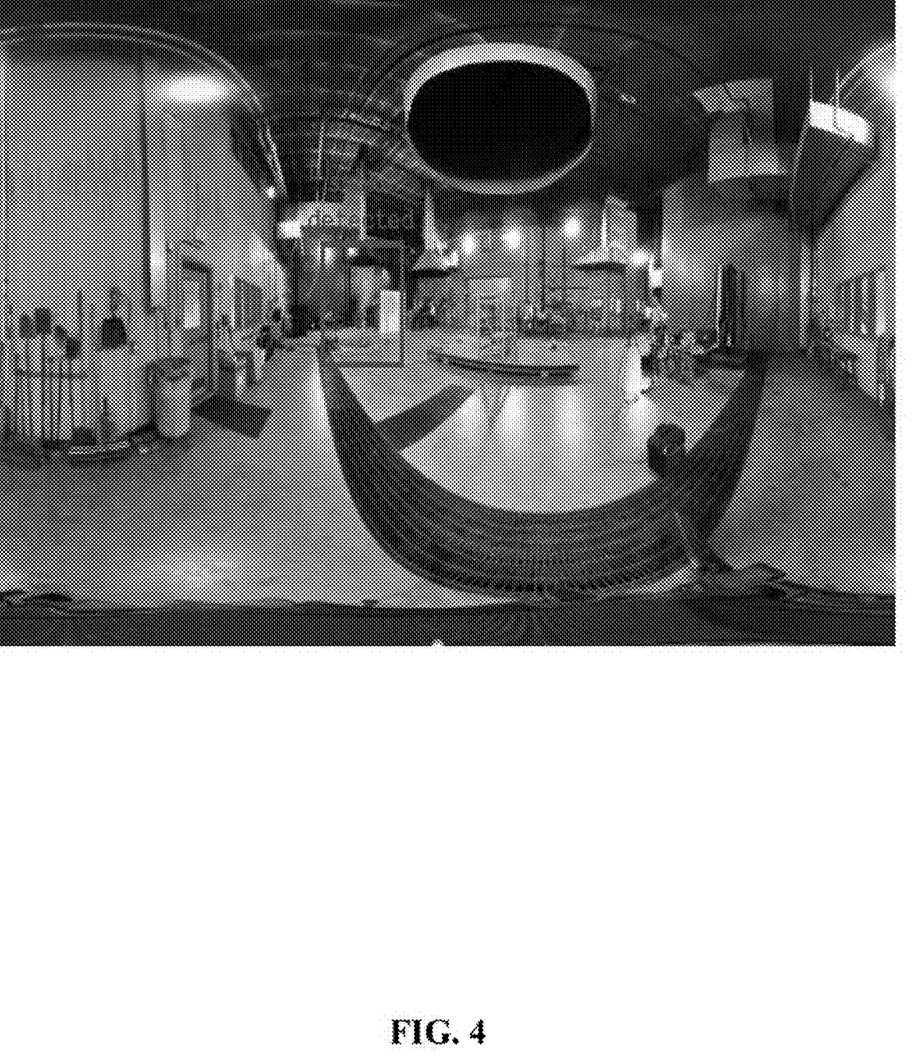
FIG. 4 depicts an equirectangular image generated by the video-based fire and smoke detection system with smoke detected and identified in a non-limiting exemplary embodiment of the invention.

The user mobile devices 110 may also immediately receive an alert when fire or smoke is detected in the environment. As an example, in embodiments where the user has already provided a primary and secondary phone number, the primary user mobile device 110 may receive an alert or text message indicating that fire or smoke was detected, along with an annotated image of the detected fire or smoke, as depicted in FIG. 4. If the primary user mobile device 110 does not respond within a certain amount of time e.g., 30 seconds, 1 minute, etc.) another message may be sent to the primary user mobile device 110 along with a message to the secondary user mobile device 110. This may continue until either the primary or secondary user mobile device 110 acknowledges the alert and takes an action to dismiss the alert or to trigger further alarms. In some embodiments, the user may have the ability to view the real-time video or image stream being gathered by the VFD system 100 in order to validate that there is indeed fife or smoke in the environment. The primary or secondary user mobile device 110 may also choose to trigger the fire alarm panel 108 at this time, in order to alert emergency services to stop the fire or smoke.

Figure 3:
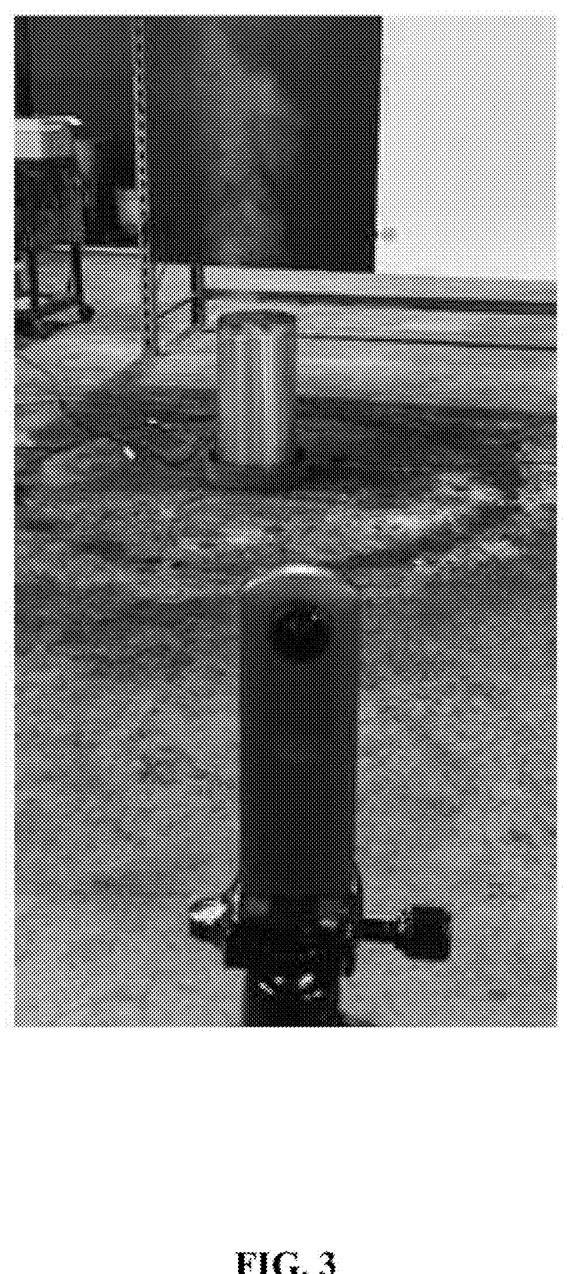
FIG. 3 depicts testing and training of the video-based fire and smoke detection system in a non-limiting exemplary embodiment of the invention.

FIG. 3 depicts testing and training of the VFD system 100 in a non-limiting exemplary, embodiment of the invention. The figure depicts the VFD system 100 placed in an environment where smoke and fire 302 are created in a controlled environment to generate data for training, validating, and testing the CNN of the VFD system 100. This figure depicts smoke being generated.

FIG. 4 depicts an equirectangular image generated by the VFD system 100 notated with smoke detected and identified in a non-limiting exemplary embodiment of the invention. In this figure, the NTH) system 100 has detected smoke and has annotated the image to indicate that 1) smoke was detected and 2) where the smoke was detected.

In the equirectangular image of FIG. 4, the VIM system 100 has annotated the equirectangular image with information regarding the lire or smoke detected. This annotation may be beneficial to the user to immediately identify the area of concern and address the fire or smoke emergency. If multiple sources of smoke or fire are detected, each instance may be identified and annotated in the equirectangular image. While FIG. 4 is a depiction of an annotated image, in some embodiments, the video stream generated by the VFD system 100 may also be annotated to identify smoke or fire detected in the video.

The VFD system 100 may annotate the equirectangular image by including an identification of a portion of the image where the fire or smoke was detected. For example, in the equirectangular image of FIG. 4, the VFD system 100 has annotated the equirectangular mage by adding a red box around the area where smoke was detected. The size of the box may vary and may be determined by the VFD system 100 based on the location in the image where the fire or smoke is detected. Other shapes may be used by the VFD system 100 to identify the location of the fire or smoke. In another exemplary embodiment, the location in the image with detected fire or smoke may be shaded or highlighted.

The VFD system 100 may annotate the equirectangular image by including text indicating whether fire was detected or whether smoke was detected. For example, in the equirectangular image of FIG. 4, the VFD system 100 has annotated the equirectangular image by adding the text "smoke detected." If fire is detected, the equirectangular image may be annotated by adding the text "fire detected." In other exemplary embodiments, different text may be added.

The VFD system 100 may annotate the equirectangular image by including text indicating where the fire was detected or where the smoke was detected. For example, depending on calibration of the VFD system 100, the text may indicate the location of the detected fire or smoke. The fire and smoke detection system may be calibrated to identify places within a field of view of the 360-degree camera 102. With this calibration, the VFD system 100 may annotate the equirectangular image by including annotated text indicating a place within the field of view of the 360-degree camera 102 where the fire was detected or where the smoke was detected. As an example, in a warehouse environment, the equirectangular image may be annotated by adding text identifying the row and/or shelf where the fire was detected or where the smoke was detected.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A fire and smoke detection system comprising:
a 360-degree camera; and
a computing platform in communication with the 360-degree camera;
wherein the computing platform is configured to:
receive an image or video from the 360-degree camera;
determine that fire or smoke is detected in the image or video received from the 360-degree camera, wherein determining that fire or smoke is detected comprises using a convolutional neural network to determine that fire or smoke is detected in the image or video received from the 360-degree camera; and
generate at least one alert in response to determining that fire or smoke is detected in the image or video received from the 360-degree camera,
wherein the fire and smoke detection system is portable and not removably mounted, and
wherein the convolutional neural network is a distortion-aware convolutional neural network trained using video or image data collected via fire testing using smoke or fire events selected from the group consisting of: rack storage fires, pool fires, wall fires, and smoke generators.

2. The fire and smoke detection system of claim 1, wherein the image or video used by the computing platform to determine that fire or smoke is detected is an equirectangular image or equirectangular video.

3. The fire and smoke detection system of claim 1, wherein the 360-degree camera provides the image or video to the computing platform as an equirectangular image or equirectangular video.

4. The fire and smoke detection system of claim 1,
wherein the convolutional neural network is a able to detect fire in the image or video received from the 360-degree camera, and
wherein the convolutional neural network is able to detect smoke in the image or video received from the 360-degree camera.

5. The fire and smoke detection system of claim 1, wherein generating at least one alert in response to determining that fire or smoke is detected comprises:
sending a text message to a first user mobile device, the text message indicating that fire or smoke was detected, the text message including an annotated image of the fire or smoke detected.

6. The fire and smoke detection system of claim 5, wherein the annotated image includes an annotated identification of a portion of the image where the fire or smoke was detected.

7. The fire and smoke detection system of claim 5, wherein the annotated image includes annotated text indicating whether fire was detected or whether smoke was detected.

8. The fire and smoke detection system of claim 5, wherein the fire and smoke detection system is calibrated to identify places within a field of view of the 360-degree camera, and wherein the annotated image includes annotated text indicating a place within the field of view of the 360-degree camera where the fire was detected or where the smoke was detected.

9. The fire and smoke detection system of claim 5, wherein generating at least one alert in response to determining that fire or smoke is detected further comprises:

after the text message is sent, waiting for a predetermined time period for the first user mobile device to acknowledge the text message;

in response to failing to receive an acknowledgement from the first user mobile device within the predetermined time period, sending a second text message to a second user mobile device, the second text message indicating that fire or smoke was detected, the second text message including an annotated image of the fire or smoke detected.

10. The fire and smoke detection system of claim 1, wherein generating at least one alert in response to determining that fire or smoke is detected comprises sending a signal to a local alarm to sound an alarm, wherein the alarm may be audible in the vicinity of the fire and smoke detection system.

11. The fire and smoke detection system of claim 1, wherein generating at least one alert in response to determining that fire or smoke is detected comprises sending a signal to a fire alarm panel to trigger an alarm.

12. A method to detect fire and smoke using a portable system, the portable system comprising, a computing platform and a 360-degree camera in communication with the computing platform, the computing platform comprising one or more microprocessors and memory, the computing platform using the one or more microprocessors to execute software code stored in the memory, the method comprising:

capturing an image or video by the 360-degree camera;

transforming the image or video to an equirectangular image or equirectangular video;

processing the equirectangular image or equirectangular video by the computing platform using convolutional neural network software code to determine whether fire appears in the equirectangular image or equirectangular video;

processing the equirectangular image or equirectangular video by the computing platform using the convolutional neural network software code to determine whether smoke appears in the equirectangular image or equirectangular video; and generating at least one alert in response to determining that fire or smoke is in the image or video received from the 360-degree camera;

wherein the convolutional neural network software code comprises a distortion-aware convolutional neural network trained using video or image data collected via fire testing using smoke or fire events selected from the group consisting of: rack storage fires, pool fires, wall fires, and smoke generators.

13. The method of claim 12, the method further comprising:

sending a text message to a first user mobile device, the text message indicating that fire or smoke was detected, the text message including an annotated image of the fire or smoke detected.

14. The method of claim 13, the method further comprising:

after the text message is sent, waiting for a predetermined time period for the first user mobile device to acknowledge the text message;

in response to failing to receive an acknowledgement from the first user mobile device within the predetermined time period, sending a second text message to a second user mobile device, the second text message indicating that fire or smoke was detected, the second text message including an annotated image of the fire or smoke detected.

\* \* \* \* \*

UNITED STATES PATENT AND TRADEMARK OFFICE
CERTIFICATE OF CORRECTION

PATENT NO. : 11,080,990 B2
APPLICATION NO. : 16/532082
DATED : August 3, 2021
INVENTOR(S) : Jaap De Vries et al.

Page 1 of 1

It is certified that error appears in the above-identified patent and that said Letters Patent is hereby corrected as shown below:

In the Claims

In Claim 4, Column 8, Line 43, "network is a able to" should read -- network is able to --.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*